US012183279B2

(12) United States Patent
Hu

(10) Patent No.: US 12,183,279 B2
(45) Date of Patent: Dec. 31, 2024

(54) PIXEL DRIVING CIRCUIT AND DISPLAY PANEL

(71) Applicant: TCL CHINA STAR OPTOELECTRONICS TECHNOLOGY CO., LTD., Shenzhen (CN)

(72) Inventor: Liang Hu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/790,062

(22) PCT Filed: Jun. 27, 2022

(86) PCT No.: PCT/CN2022/101521
§ 371 (c)(1),
(2) Date: Jun. 29, 2022

(87) PCT Pub. No.: WO2023/231106
PCT Pub. Date: Dec. 7, 2023

(65) Prior Publication Data
US 2024/0185777 A1 Jun. 6, 2024

(30) Foreign Application Priority Data
May 31, 2022 (CN) ......................... 202210615785.8

(51) Int. Cl.
*G09G 3/3233* (2016.01)

(52) U.S. Cl.
CPC ... *G09G 3/3233* (2013.01); *G09G 2300/0852* (2013.01); *G09G 2300/0861* (2013.01); *G09G 2310/08* (2013.01); *G09G 2320/0233* (2013.01)

(58) Field of Classification Search
CPC ...... G09G 3/32–3291; G09G 2300/0421–043; G09G 2300/0809;
(Continued)

(56) References Cited

U.S. PATENT DOCUMENTS

2008/0203931 A1* 8/2008 Kim ..................... G09G 3/3233 445/24
2014/0146031 A1* 5/2014 Lee ...................... G09G 3/3291 345/212
(Continued)

FOREIGN PATENT DOCUMENTS

CN 106531074 A 3/2017
CN 108492774 A 9/2018
(Continued)

OTHER PUBLICATIONS

PCT International Search Report for International Application No. PCT/CN2022/101521, mailed on Dec. 16, 2022, 10pp.
(Continued)

*Primary Examiner* — Nathan Danielsen
(74) *Attorney, Agent, or Firm* — The Roy Gross Law Firm, LLC; Roy Gross

(57) ABSTRACT

The present disclosure provides a pixel driving circuit and a display panel, including a data transistor connected to a data line, a driving transistor connected in series with a light emitting element between a first power supply line and a second power supply line, and a boost module of which an input terminal is loaded with a boost input signal. A source and a gate of the driving transistor are respectively electrically connected to the light emitting element and the data transistor, and an output terminal of the boost module is electrically connected to the gate of the driving transistor to enable the voltage of the gate of the driving transistor to boost from a first voltage to a second voltage.

17 Claims, 7 Drawing Sheets

(58) Field of Classification Search
CPC ... G09G 2300/0819; G09G 2300/0852; G09G 2300/0861; G09G 2310/06; G09G 2310/08; G09G 2320/0233; G09G 2320/029; G09G 2320/0295; G09G 2320/0626
See application file for complete search history.

(56) References Cited

U.S. PATENT DOCUMENTS

| | | | | |
|---|---|---|---|---|
| 2015/0123557 | A1* | 5/2015 | Lee | G09G 3/3233 315/228 |
| 2020/0184894 | A1* | 6/2020 | Shi | G09G 3/32 |

FOREIGN PATENT DOCUMENTS

| | | | |
|---|---|---|---|
| CN | 108847183 | A | 11/2018 |
| CN | 111383600 | A | 7/2020 |
| CN | 111627375 | A | 9/2020 |
| CN | 111640397 | A | 9/2020 |
| CN | 111883050 | A | 11/2020 |
| CN | 113421525 | A | 9/2021 |
| CN | 114170956 | A | 3/2022 |
| JP | 2011107187 | A | 6/2011 |
| JP | 2013092681 | A | 5/2013 |

OTHER PUBLICATIONS

PCT Written Opinion of the International Search Authority for International Application No. PCT/CN2022/101521, mailed on Dec. 16, 2022, 8pp.

Chinese Office Action issued in corresponding Chinese Patent Application No. 202210615785.8 dated Nov. 12, 2024, pp. 1-11.

* cited by examiner

PIXEL DRIVING CIRCUIT AND DISPLAY PANEL

CROSS REFERENCE TO RELATED APPLICATIONS

This application is a National Phase of PCT Patent Application No. PCT/CN2022/101521 having International filing date of Jun. 27, 2022, which claims the benefit of Chinese Patent Application No. 202210615785.8, filed May 31, 2022, the contents of which are all incorporated herein by reference in their entirety.

TECHNICAL FIELD

The present disclosure relates to a field of display technology, and in particular to a field of display panel manufacturing technologies, and specifically to a pixel driving circuit and a display panel.

BACKGROUND

For the current-driven light emitting elements, light emitting brightness depends on a magnitude of a current flowing through the light emitting element. After the panel is produced, the light emitting brightness of the light emitting element is generally adjusted by adjusting the magnitude of the data voltage, while the gate-source voltage of the driving transistor does not change in the light emitting phase, that is, the light emitting brightness of the light emitting element cannot be changed. However, limited by the hardware influence of the data driving chip, and considering the impact of compensation in terms of a threshold voltage, a uniformity image, and the like, the driving transistor has a relatively low gate-source voltage in the light emitting phase, so that the current flowing through the light emitting element is relatively small, and brightness of the light emitting element and a self-emitting display formed thereby is relatively low.

Therefore, an existing current driven display has a relatively low light emitting brightness due to the limitation of the hardware of the data driving chip, which needs to be improved.

Technical Problems

Embodiments of the present disclosure provide a pixel driving circuit and a display panel, so as to resolve a technical problem that the existing current driven display has a relatively low light emitting brightness restricted to the hardware influence of the data driving chip.

Technical Solutions to the Problems

The present disclosure provides a pixel driving circuit, including:

a driving transistor connected in series with a light emitting element between a first power supply line and a second power supply line, wherein a source of the driving transistor is electrically connected to the light emitting element;

a data transistor, wherein a source of the data transistor is electrically connected to a data line, a drain of the data transistor is electrically connected to a gate of the driving transistor, and a gate of the data transistor is loaded with a data control signal; and a boost module, wherein an input terminal of the boost module is configured to be loaded with a boost input signal, and an output terminal of the boost module is electrically connected to the gate of the driving transistor;

wherein the boost module is configured to control the voltage of the gate of the driving transistor to boost from a first voltage in a first stage to a second voltage in a second stage, the second stage is later than the first stage, and the driving transistor is configured to generate a driving current based at least on the second voltage to drive the light emitting element to emit light.

Beneficial Effects

The present disclosure provides the pixel driving circuit and the display panel. The pixel driving circuit includes: the driving transistor connected in series with the light emitting element between the first power supply line and the second power supply line, wherein the source of the driving transistor is electrically connected to the light emitting element; the data transistor, wherein the source of the data transistor is electrically connected to the data line, the drain of the data transistor is electrically connected to the gate of the driving transistor, and the gate of the data transistor is loaded with the data control signal; and the boost module, wherein the input terminal of the boost module is configured to be loaded with the boost input signal, and the output terminal of the boost module is electrically connected to the gate of the driving transistor; wherein the boost module controls the gate of the driving transistor to boost the first voltage in the first stage to the second voltage in the second stage, the second stage is later than the first stage, and the driving transistor is configured to generate the driving current based at least on the second voltage to drive the light emitting element to emit light. In the present disclosure, by disposing the boost module of which the input terminal is loaded with the boost input signal and the output terminal is electrically connected to the gate of the driving transistor, the gate voltage of the driving transistor can be modulated from a first voltage to a second voltage, so as to increase the driving current flowing through the light emitting element, thereby improving light emitting brightness of the light emitting element, and thus improving brightness of the display panel.

BRIEF DESCRIPTION OF THE DRAWINGS

The present disclosure is further illustrated below by referring to the accompanying drawings. It should be noted that the accompanying drawings in the following description are merely intended to explain some embodiments of the present disclosure. A person skilled in the art may still obtain other drawings from these accompanying drawings without creative efforts.

EMBODIMENTS OF THE PRESENT DISCLOSURE

Figure 1:
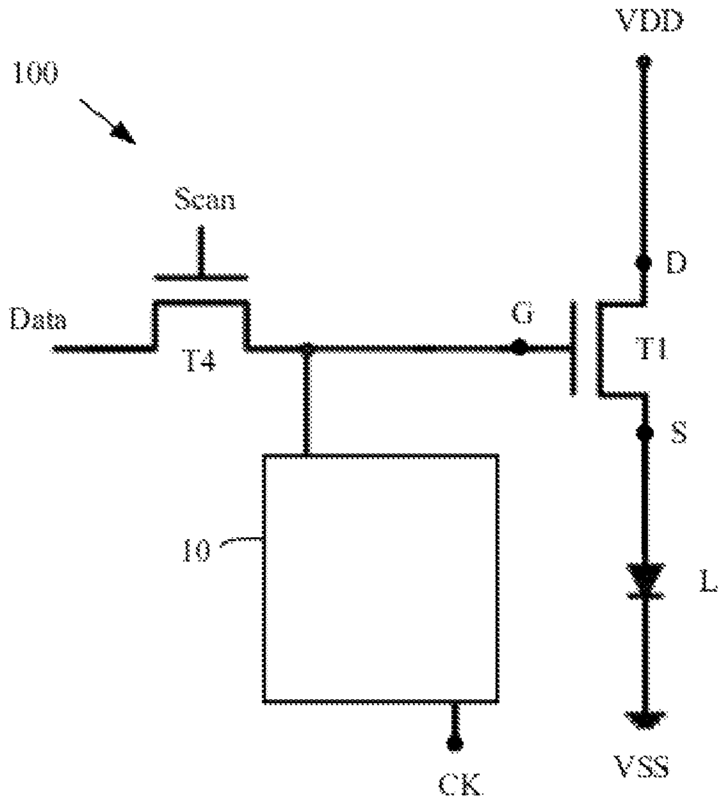
FIG. 1 is a circuit diagram of a first pixel driving circuit according to an embodiment of the present disclosure.

Technical solutions in embodiments of the present disclosure will be clearly and completely described below in conjunction with drawings in the embodiments of the present disclosure. Obviously, the described embodiments are only a part of embodiments of the present disclosure, rather than all the embodiments. Any ordinarily skilled person in the technical field of the present invention could still obtain other accompanying drawings without use laborious invention based on the present accompanying drawings.

The terms "first", "second" and "third" in the present disclosure are used to distinguish different objects, and are not used to describe a specific order. In addition, the terms "include" and "have" and any variations thereto are intended to cover non-exclusive inclusions. In addition, the terms "source" and "drain" may be interchanged, as long as a corresponding transistor has at least one source and at least one drain. For example, a process, a method, a system, a product, or a device that includes a series of steps or modules is not limited to the listed steps or modules, but optionally further includes the unlisted steps or modules, or optionally further includes another step or module inherent to the process, the method, the product, or the device.

The term "embodiments" referred in this specification means that specific features, structures, or characteristics described in connection with the embodiments may be included in at least one embodiment of the present disclosure. The term "embodiments" appearing at all locations in the specification does not necessarily refer to same embodiments, or they are independent or alternative embodiments that are compatible or not compatible each other. It is explicitly and implicitly understood by a person skilled in the art that the embodiments described in this specification may be combined with other embodiments.

An embodiment of the present disclosure provides a pixel driving circuit. The pixel driving circuit includes, but not limited to, those illustrated in the following embodiments and a combination of the following embodiments.

In an embodiment, as shown in FIG. 1 to FIG. 6, the pixel driving circuit 100 includes: a driving transistor T1 connected in series with a light emitting element L between a first power supply line and a second power supply line, where a source S of the driving transistor T1 is electrically connected to the light emitting element L; a data transistor T4, where a source of the data transistor T4 is electrically connected to a data line, a drain of the data transistor T4 is electrically connected to a gate G of the driving transistor T1, and a gate of the data transistor T4 is loaded with a data control signal Scan; and a boost module 10, where an input terminal of the boost module 10 is loaded with a boost input signal CK, and an output terminal of the boost module 10 is electrically connected to the gate G of the driving transistor T1; where, the boost module 10 controls the voltage of the gate G of the driving transistor T1 to boost from a first voltage Vgl in a first stage to a second voltage Vg2 in a second stage, the second stage is later than the first stage, and the driving transistor T1 is configured to generate a driving current based at least on the second voltage Vg2 to drive the light emitting element L to emit light.

As shown in FIG. 1 to FIG. 6, a first power supply line may be loaded with a first signal VSS, a second power supply line may be loaded with a second signal VDD, a magnitude of the first signal VSS and a magnitude of the second signal VDD may be respectively two constant voltage values, and a voltage value corresponding to the first signal VSS may be less than a voltage value corresponding to the second signal VDD. The driving transistor T1 may be an N-type transistor or a P-type transistor, and the light emitting element L may be, but not limited to, an organic light emitting semiconductor, a light emitting diode, a micro light emitting diode, or a sub-millimeter light emitting diode.

Specifically, as shown in FIG. 1 to FIG. 6, an example in which the driving transistor T1 is an N-type transistor is taken herein. In combination with the foregoing, the drain D of the driving transistor T1 may be electrically connected to the second power supply line to be loaded with the second signal VDD, the source S of the driving transistor T1 may be electrically connected to an anode of the light emitting element L, and a cathode of the light emitting element L may be electrically connected to the first power supply line to be loaded with the first signal VSS. For example, a voltage value corresponding to the first signal VSS may be 0 volt, that is, the cathode of the light emitting element L may be grounded. Specifically, a gate-source voltage Vgs between the gate G of the driving transistor T1 and the source S of the driving transistor T1 drives the light emitting element L to emit light. When the driving transistor T1 is turned on, a driving current flowing to the light emitting element L may be generated under the action of the first signal VSS and the second signal VDD. A magnitude of the driving current is positively correlated with the gate-source voltage Vgs between the gate G of the driving transistor T1 and the source S of the driving transistor T1, and a voltage loaded to the gate G of the driving transistor T1 may generally be determined based on a voltage value corresponding to an expected gray scale of the light emitting element L. That is, it may be considered that the magnitude of the driving current flowing to the light emitting element L is determined based on the voltage value corresponding to the expected gray scale of the light emitting element L, so as to determine the light emitting brightness of the light emitting element L.

It should be noted that, when the pixel driving circuit 100 is in a light emitting phase, because the light emitting element L has a relatively stable voltage drop, the source voltage Vs of the source S of the driving transistor T1 may be a relatively stable value. That is, it may be considered that, in this case, the light emitting brightness of the light emitting element L may be determined by the gate voltage Vg of the gate G of the driving transistor T1. It may be known in combination with the foregoing that the gate voltage Vg loaded to the gate G of the driving transistor T1 may generally be determined based on a voltage value corresponding to an expected gray scale of the light emitting element L. However, limited by hardware of a data driving chip, and considering the impact of compensation such as a threshold voltage and an uniformity image, it is actually relatively small for a voltage that is "determined based on a voltage value corresponding to an expected gray scale of the light emitting element L" and loaded to the gate G of the driving transistor T1, so that a driving current flowing through the light emitting element L is relatively small, and thus the light emitting brightness of the light emitting element L is relatively low.

It may be understood that the present embodiment is provided with the boost module 10 of which the input terminal is loaded with the boost input signal CK and the output terminal is electrically connected to the gate G of the driving transistor T1. Compared with the foregoing, that is, the gate voltage Vg of the gate G of the driving transistor T1 may further be determined by the boost input signal CK. In the first stage, the gate G of the driving transistor T1 has the first voltage Vg1. In combination with the foregoing, the first stage herein may be considered as the "light emitting stage" mentioned above. The first voltage Vg1 may be determined by at least the voltage that is "determined based on a voltage value corresponding to an expected gray scale of the light emitting element L" and loaded to the gate G of the driving transistor T1. Further, in the present embodiment, the boost module 10 can be configured to control the gate G of the driving transistor T1 to have the second voltage Vg2 related to the boost input signal CK in the second stage, where the second voltage Vg2 is greater than the first voltage Vg1, and it may be considered that the second stage herein is later than the first stage. That is, the gate voltage Vg of the driving transistor T1 may be boosted from the first voltage Vg1 to the second voltage Vg2 under the action of the boost module 10 and the boost input signal CK, so as to increase the driving current flowing through the light emitting element L, thereby improving the light emitting brightness of the light emitting element L. A specific structure of the boost module 10 and a waveform of the boost input signal CK may be properly set according to an actual situation, so as to better improve light emitting brightness of the light emitting element L.

In an embodiment, as shown in FIG. 2 to FIG. 6, the boost module 10 includes: a first capacitor C1, where a first electrode plate of the first capacitor C1 is electrically connected to the gate G of the driving transistor T1 to serve as the output terminal of the boost module 10; a first boost transistor T2, where a drain of the first boost transistor T2 is electrically connected to a second electrode plate of the first capacitor C1, a source of the first boost transistor T2 is electrically connected to the input terminal of the boost module 10, a gate of the first boost transistor T2 is loaded with a first boost control signal, and the first boost transistor T2 is turned on in both the first phase and the second phase; where the boost input signal CK has a first boost input voltage Vcl in the first phase and a second boost input voltage Vch in the second phase, and the second boost input voltage is greater than the first boost input voltage.

Figure 2:
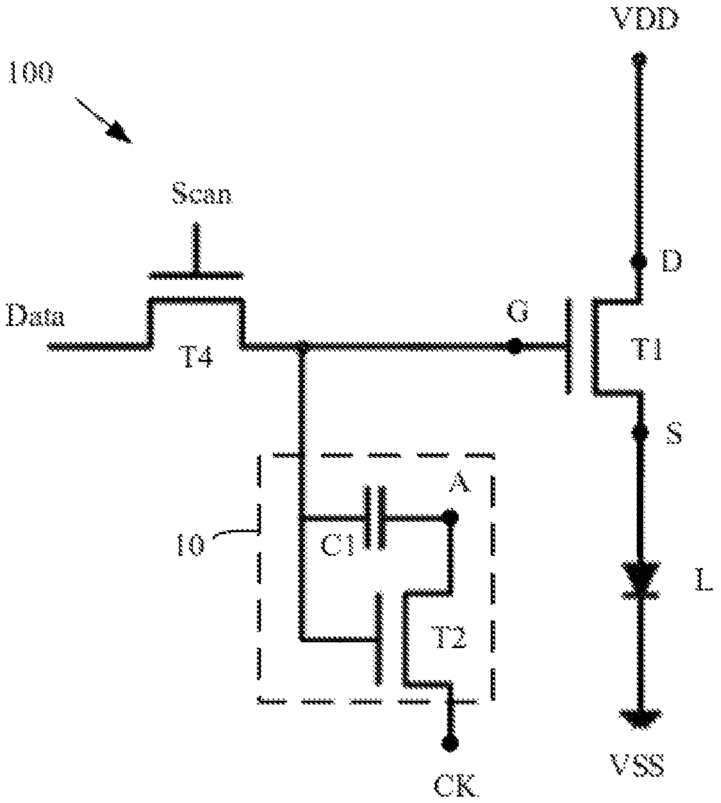
FIG. 2 is a circuit diagram of a second pixel driving circuit according to an embodiment of the present disclosure.

The first boost transistor T2 may be an N-type transistor or a P-type transistor. An example in which the first boost transistor T2 is an N-type transistor and the second electrode plate of the first capacitor C1 is electrically connected to a node A is taken herein. Specifically, as shown in FIG. 2, the gate of the first boost transistor T2 may be electrically connected to the gate G of the driving transistor T1 to obtain the gate voltage Vg of the gate G of the driving transistor T1 as the first boost control signal. In combination with the foregoing, in a first stage, that is, in a light emitting stage, the gate voltage Vg of the gate G of the driving transistor T1 has a larger first voltage Vg1 to turn on the driving transistor T1. It may be also considered that the first boost transistor T2 is turned on at the same time, so that the boost input signal CK is loaded to the second electrode plate of the first capacitor C1 via the first boost transistor T2 to cause the voltage of the node A to be equal to the first boost input voltage Vcl. In a second stage, the first boost transistor T2 may still be driven via the gate voltage Vg of the gate G of the driving transistor T1 to be turned on at an initial moment of the second stage, so that the boost input signal CK is loaded to the second electrode plate of the first capacitor C1 via the first boost transistor T2 to cause the voltage of the node A to be equal to the second boost input voltage Vch. That is, the change value ΔVa of the voltage of the node A may be positively correlated with (Vch−Vcl), or even equal to (Vch−Vcl). Because the voltage difference across the first capacitor C1 cannot be abruptly changed, the change value of the gate voltage Vg of the gate G of the driving transistor T1 electrically connected to the first electrode plate of the first capacitor C1 is also positively correlated with (Vch−Vcl), or even equal to (Vch−Vcl), so that the gate voltage Vg of the gate G of the driving transistor T1 is boosted from the first voltage Vg1 to the second voltage Vg2, thereby increasing the driving current flowing through the light emitting element L, and improving the light emitting brightness of the light emitting element L.

Figure 3:
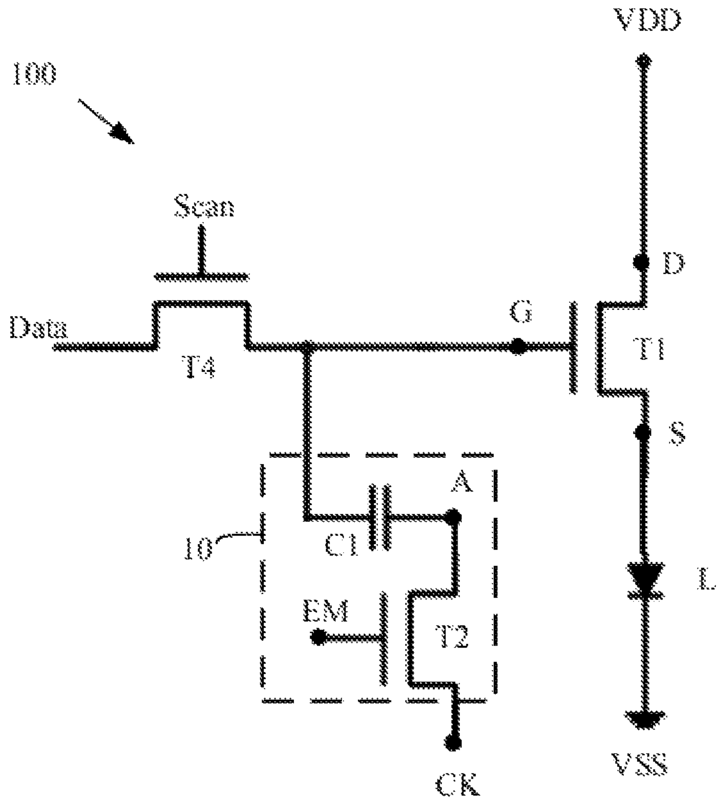
FIG. 3 is a circuit diagram of a third pixel driving circuit according to an embodiment of the present disclosure.

Certainly, as shown in FIG. 3, the gate of the first boost transistor T2 may also be electrically connected to the boost control line to be loaded with the first boost control signal, and the first boost control signal may be, but not limited to, a light emitting control signal EM. A waveform of the signal transmitted on the boost control line may be the same as or different from a waveform of the gate voltage Vg of the gate G of the driving transistor T1, provided that the first boost transistor T2 may be controlled to be turned on in the first stage and the second stage. Specifically, an operation principle of the gate voltage Vg of the gate G of the driving transistor T1 may be the same as the foregoing operation principle of "the gate of the first boost transistor T2 may be electrically connected to the gate G of the driving transistor T1" on the gate voltage Vg of the gate G of the driving transistor T1.

Particularly, when the first boost transistor T2 is turned on, if a voltage value of the boost input signal CK remains unchanged, that is, a voltage of the node A remains unchanged, then the gate voltage Vg of the gate G of the driving transistor T1 also remains unchanged when the gate G of the driving transistor T1 is switched from the first voltage Vg1 being loaded to the gate G to a floating state because the voltage difference across the first capacitor C1 cannot be abruptly changed.

Figure 4:
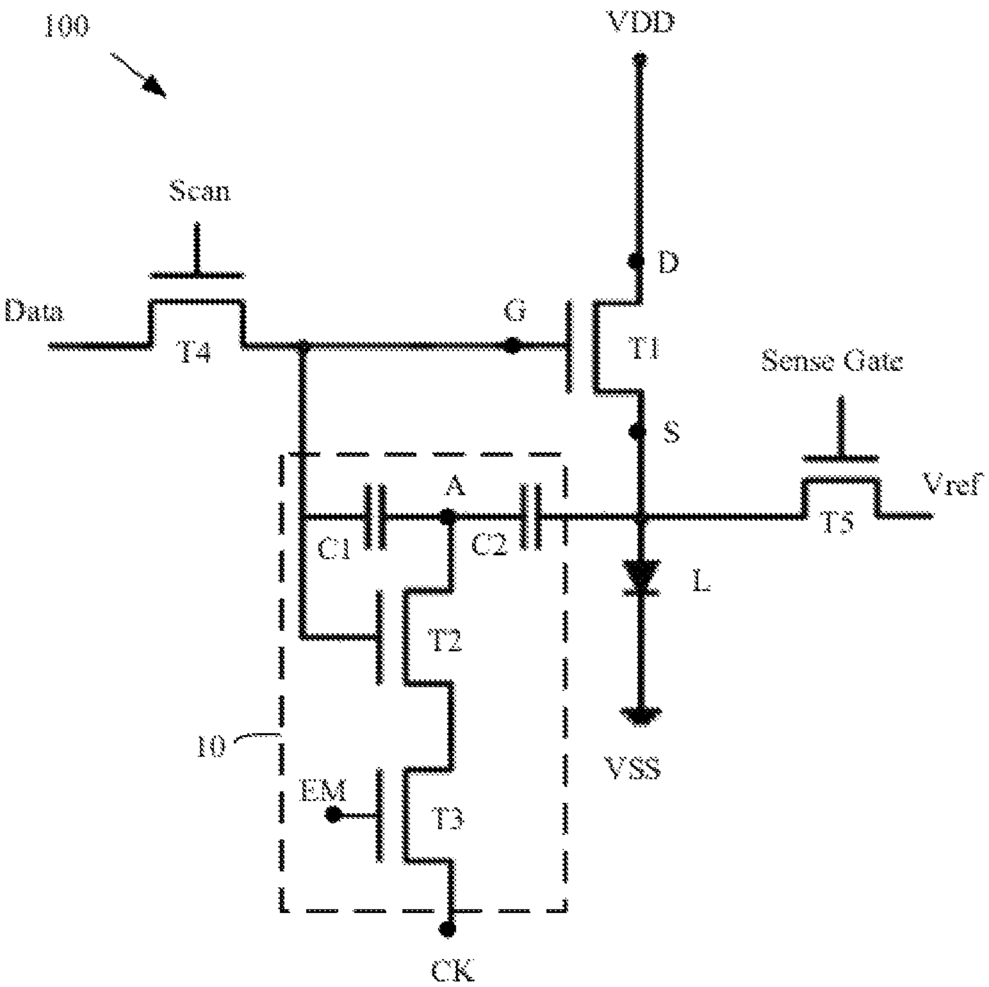
FIG. 4 is a circuit diagram of a fourth pixel driving circuit according to an embodiment of the present disclosure.
Figure 5:
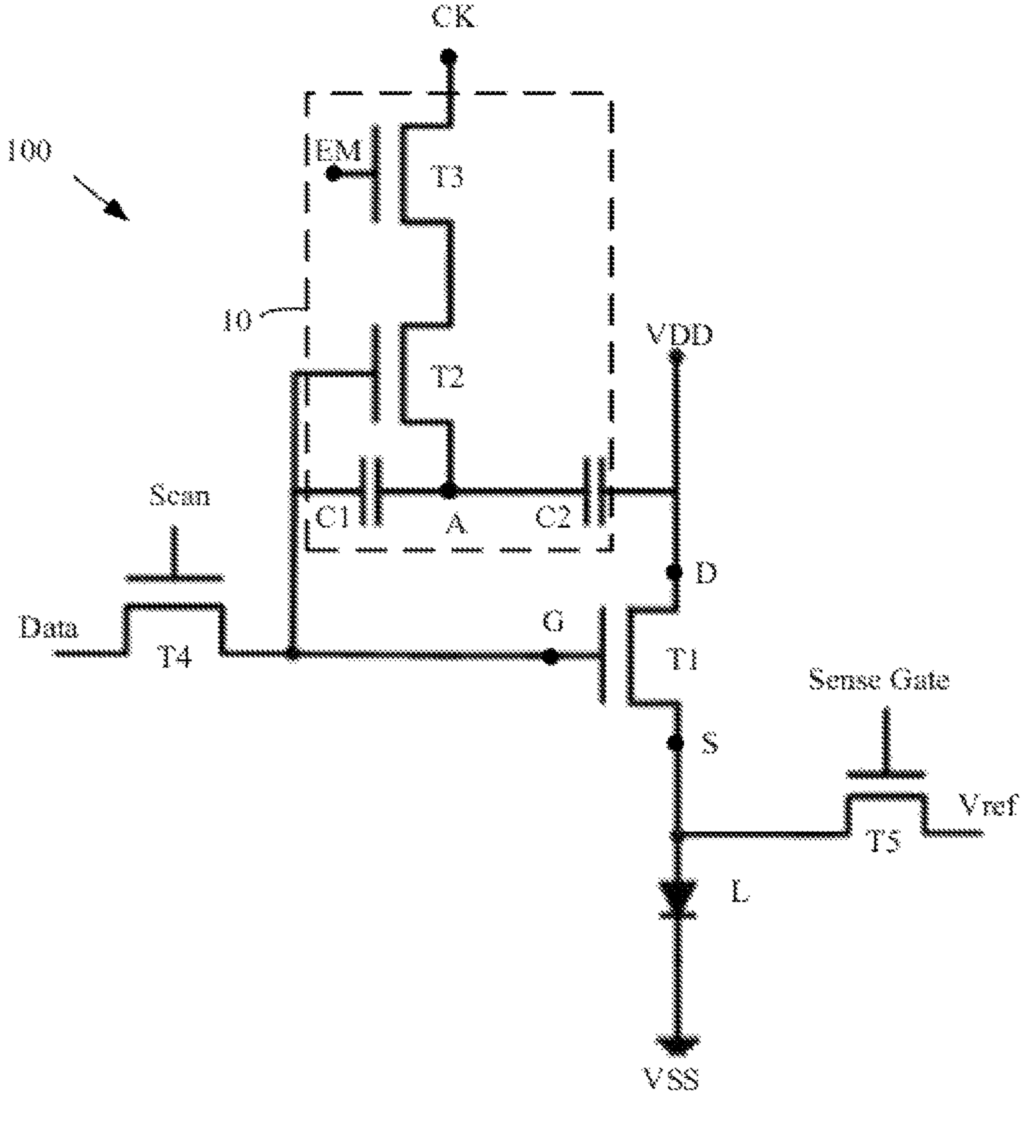
FIG. 5 is a circuit diagram of a fifth pixel driving circuit according to an embodiment of the present disclosure.

In an embodiment, as shown in FIG. 4 and FIG. 5, the boost module 10 further includes: a second boost transistor T3, where a drain of the second boost transistor T3 is electrically connected to the source of the first boost transistor T2, a source of the second boost transistor T3 is electrically connected to the input terminal of the boost module 10, a gate of the second boost transistor T3 is loaded with a second boost control signal, and the second boost transistor T3 is turned on in both the first phase and the second phase, where the gate of the first boost transistor T2 is electrically connected to the gate G of the driving transistor T1.

Specifically, in combination with the foregoing, based on such an embodiment in which the gate of the first boost transistor T2 may be electrically connected to the gate G of the driving transistor T1 to obtain the gate voltage Vg of the gate G of the driving transistor T1 as the first boost control signal, the embodiment is equivalent to an embodiment which adds a second boost transistor T3 connected in series between the input terminal of the boost module 10 and the node A and controlled by the second boost control signal to be turned on. The second boost control signal may be, but not limited to, a light emitting control signal generated by the light emitting control circuit (e.g., the light emitting control signal EM). That is, it may be considered that the first boost control signal and the second boost control signal jointly determine whether the boost input signal CK can be loaded to the node A. In combination to the foregoing, that is, on the basis of controlling, by means of the first boost control signal, whether to turn on the first boost transistor T2 in the first stage and the second stage, the present embodiment can implement further control on whether the boost input signal CK can be loaded to the node A by using the added second boost control signal and the added second boost transistor T3, thereby improving an accuracy of the operation of the boost block 10.

In an embodiment, as shown in FIG. 4 and FIG. 5, the pixel driving circuit 100 further includes: a second capacitor C2, where a first electrode plate of the second capacitor C2 is electrically connected to the second electrode plate of the first capacitor C1, and a second electrode plate of the second capacitor C2 is electrically connected to the source S (as shown in FIG. 4) or the drain D (as shown in FIG. 5) of the driving transistor T1.

It should be noted that, in combination with the foregoing, when at least one of the first boost transistor T2 and the second boost transistor T3 is turned off, that is, the node A is in the floating state, the first capacitor C1 and the second capacitor C2 are connected in series between the gate G and the source S of the driving transistor T1, or are connected in series between the gate G and the drain D of the driving transistor T1. When the gate G of the driving transistor T1 is switched from the first voltage Vg1 being loaded to the gate G to the floating state, since the voltage difference across the first capacitor C1 and the second capacitor C2 cannot be abruptly changed, the change amount of the gate voltage Vg of the gate G of the driving transistor T1 is equal to the change amount of the voltage of either the gate G or the drain D of the driving transistor T1. Particularly, in a time period, when the voltage change amount of either the gate G or the drain D of the driving transistor T1 is 0, it may be considered that the gate voltage Vg of the gate G of the driving transistor T1 may be maintained to be equal to the first voltage Vg1.

In another embodiment, in combination with the foregoing, unlike the foregoing embodiments, based on the configuration that the first electrode plate of the second capacitor C2 is electrically connected to the second electrode plate of the first capacitor C1, the second electrode plate of the second capacitor C2 may also be configured to be grounded, so as to maintain a voltage of the second electrode plate of the second capacitor C2 unchanged, so that the gate voltage Vg of the gate G of the driving transistor T1 may also be maintained to be equal to the first voltage Vg1. Alternatively, different from the foregoing embodiments, the second capacitor C2 may be connected in series between the gate G of the driving transistor T1 and the ground. Likewise, because the second capacitor C2 is grounded, the gate voltage Vg of the gate G of the driving transistor T1 may be also maintained to be equal to the first voltage Vg1.

Figure 6:
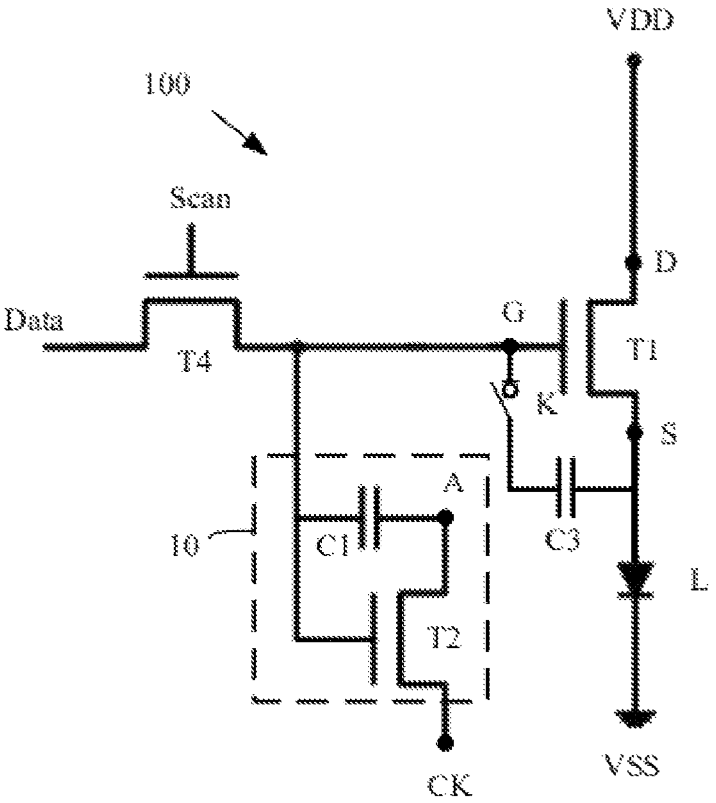
FIG. 6 is a circuit diagram of a sixth pixel driving circuit according to an embodiment of the present disclosure.

In an embodiment, as shown in FIG. 6, the boost module 10 further includes: a third capacitor C3; and a boost switch K connected in series with the third capacitor C3 between the gate G of the driving transistor T1 and the source S of the driving transistor T1, where, in the first stage and a third stage earlier than the first stage, the boost switch K is turned on to control the voltage of the gate G of the driving transistor T1 to boost from a third voltage Vg3 in the third stage to the first voltage Vg1 in the first stage.

Likewise, in combination with the foregoing, the gate G of the driving transistor T1 has the first voltage Vg1 in the first stage, and the first stage may be considered as the foregoing "light emitting stage". The first voltage Vg1 may be determined by at least the voltage that is "determined based on the voltage value corresponding to the expected gray scale of the light emitting element L" and loaded to the gate G of the driving transistor T1, that is, it can be considered that the first voltage Vg1 is related to the voltage of the source S of the driving transistor T1.

Specifically, in the embodiment, the boost module 10 is further configured to cause the gate G of the driving transistor T1 to have the third voltage Vg3 in the third stage. The third stage may be understood as a data writing stage earlier than the light emitting stage. That is, the third voltage Vg3 may be equal to the voltage that is "determined based on the voltage value corresponding to the expected gray scale of the light emitting element L" and loaded to the gate G of the driving transistor T1. In this case, the source S of the driving transistor Vg3 has a relatively low voltage. Further, in combination with the foregoing, because the light emitting element L is turned on in the light emitting stage later than the third stage, the voltage of the source S of the driving transistor Vg3 is boosted. Because the voltage difference across the third capacitor C3 cannot be abruptly changed, the gate voltage Vg of the gate G of the driving transistor Vg3 may also be boosted from the third voltage Vg3 to the first voltage Vg1, so as to increase the driving current flowing through the light emitting element L, thereby improving the light emitting brightness of the light emitting element L.

Therefore, when the third voltage Vg3 is constant, the change amount of the gate voltage Vg of the gate G of the driving transistor T1 is related to the voltage of the source S of the driving transistor T1, and is specifically related to the difference of the voltages of the source S of the driving transistor T1 in the third stage and the first stage. It should be noted that, in combination with the foregoing, the boost switch K in the embodiment may be closed at least in the third stage and the first stage, so that the third capacitor C3 is electrically connected between the gate G and the source S of the driving transistor T1 to enable the gate voltage Vg of the gate G of the driving transistor T1 to be changed with the change of the source voltage Vs of the source S of the driving transistor T1, and may be opened in the second stage, so as to avoid a case that the gate-source voltage Vgs cannot be boosted due to the source voltage Vs of the source S of the driving transistor T1 being synchronously changed with the change of the gate voltage Vg of the gate G of the driving transistor T1 and the driving current flowing through the light emitting element L cannot be increased.

In an embodiment, as shown in FIG. 4 to FIG. 6, the pixel driving circuit 100 further includes a reset transistor T5, where a source of the reset transistor T5 is electrically connected to a reset line, a drain of the reset transistor T5 is electrically connected to the source of the driving transistor T1, and a gate of the reset transistor T5 is loaded with a reset control signal Sense Gate.

It should be noted that the pixel driving circuit 100 in the present disclosure may include the boost module 10 and the driving transistor T1 as described above. Further, the pixel driving circuit 100 may further include a data writing module and a reset module that are electrically connected to the driving transistor T1. The data writing module may be electrically connected to one of the gate G and the source S of the driving transistor T1, and the reset module may be electrically connected to another of the gate G and the source S of the driving transistor T1. Specifically, an example is taken in the embodiment, in which the data writing module is electrically connected to the gate G of the driving transistor T1, the reset module is electrically connected to the source S of the driving transistor T1, the data writing module includes the data transistor T4 mentioned above, and the reset module includes the reset transistor T5 mentioned above. That is, an example is taken in the embodiment, in which the pixel driving circuit 100 can include an 3TIC circuit consisted of the driving transistor T1, the data transistor T4, the reset transistor T5, and the second capacitor C2. Certainly, the circuit included in the pixel driving circuit 100 is not limited to the 3TIC circuit, and may further include, for example, a 6TIC circuit, a 7TIC circuit, or other circuits.

It may be understood that, in combination with the foregoing, in the embodiment, the data control signal, Scan, may control the data transistor T4 to be turned on at least in the third stage, so that the data signal, Data, on the data line is loaded to the gate G of the driving transistor T1 to turn on the driving transistor T1, and the reset control signal, Sense Gate, may control the reset transistor T5 to be turned on at least before the third stage, so that the reset signal Vref on the reset line is loaded to the source S of the driving transistor T1 to reset the source S of the driving transistor T1.

An embodiment of the present disclosure provides a display panel including a pixel driving circuit. The pixel driving circuit includes: a first transistor connected in series with a light emitting element between a first power supply line and a second power supply line, where a source of the first transistor is electrically connected to the light emitting element, and a gate-source voltage between a gate of the first transistor and a source of the first transistor drives the light emitting element to emit light; a second transistor, where a source of the second transistor is electrically connected to a first signal line, a drain of the second transistor is electrically connected to the gate of the first transistor, and a gate of the second transistor is electrically connected to a second signal line; and a first module, where an input terminal of the first module is electrically connected to a third signal line, an output terminal of the first module is electrically connected to the gate of the first transistor, and a control terminal of the first module is electrically connected to a fourth signal line.

Further, in combination with FIG. 1 to FIG. 6, in the embodiment, the first transistor may refer to the foregoing related description of the driving transistor T1, the second transistor may refer to the foregoing related description of the data transistor T4, and the first module may refer to the foregoing related description of the boost module 10. Moreover, the first signal line may be the data line mentioned above, the second signal line may be loaded with the data control signal, Scan, mentioned above, the third signal line may be loaded with the boost input signal mentioned above, and the fourth signal line may be loaded with at least one of the first boost control signal and the second boost control signal mentioned above.

In an embodiment, the first module includes: a first capacitor, where a first electrode plate of the first capacitor is electrically connected to the gate of the driving transistor as the output terminal of the first module; and a third transistor, where a drain of the third transistor is electrically connected to a second electrode plate of the first capacitor, a source of the third transistor is electrically connected to the input terminal of the first module, and a gate of the third transistor is electrically connected to the fourth signal line.

Further, in combination with FIG. 1 to FIG. 6, the third transistor in the embodiment may refer to the foregoing related description of the first boost transistor T2. Moreover, the fourth signal line may be loaded with the first boost control signal mentioned above.

In an embodiment, the first module further includes: a fourth transistor, wherein a drain of the fourth transistor is electrically connected to the drain of the third transistor, a source of the fourth transistor is electrically connected to the input terminal of the first module, and a gate of the fourth transistor is electrically connected to a fifth signal line different from the gate of the driving transistor; where, the gate of the third transistor is electrically connected to the gate of the driving transistor.

Further, in combination with FIG. 1 to FIG. 6, the fourth transistor in the embodiment may refer to the foregoing related description of the second boost transistor T3. Moreover, the fourth signal line is directly connected to the gate of the driving transistor to be loaded with the first boost control signal, and the fifth signal line may be loaded with the second boost control signal.

In an embodiment, the pixel driving circuit further includes: a second capacitor, where a first electrode plate of the second capacitor is electrically connected to the second electrode plate of the first capacitor and a second electrode plate of the second capacitor is electrically connected to the source or the drain of the first transistor.

Further, in combination with FIG. 1 to FIG. 6, the second capacitor in the embodiment may refer to the foregoing related description of the second capacitor C2.

In an embodiment, the first module further includes: a third capacitor; and a first switch connected in series with the third capacitor between the gate of the first transistor and the source of the first transistor, where, in the first stage and a third stage earlier than the first stage, the first switch is turned on to control the voltage of the gate of the first transistor to boost from a third voltage in the third stage to the first voltage in the first stage.

Further, as shown in FIG. 6, the third capacitor in the embodiment may refer to the foregoing related description of the third capacitor C3, and the first switch may refer to the foregoing related description of the boost switch K.

In some embodiments, the pixel driving circuit further includes: a fifth transistor, where a source of the fifth transistor is electrically connected to a sixth signal line, a drain of the fifth transistor is electrically connected to the source of the first transistor, and a gate of the fifth transistor is electrically connected to a seventh signal line.

Further, in combination with FIG. 1 to FIG. 6, the fifth transistor in the embodiment may refer to the foregoing related description of the reset transistor T5. Moreover, the sixth signal line may refer to the reset line mentioned above, and the seventh signal line may be loaded with the reset control signal, Sense Gate.

An embodiment of the present disclosure provides a driving method for driving the pixel driving circuit 100 according to any of the foregoing as shown in FIG. 1 to FIG. 6, including: configuring, in the first stage, the boost input signal CK based on a source voltage Vs of the source S of the driving transistor T1; and controlling the gate G of the driving transistor T1 to have a second voltage Vg2 associated with the boost input signal CK by the boost input signal CK and the boost module 10, where, the second voltage Vg2 is greater than a first voltage Vg1 at the gate of the driving transistor T1 in the first stage.

Specifically, in combination with the foregoing, the magnitude of the driving current flowing through the light emitting element L is positively correlated with the gate-source voltage Vgs between the gate G and the source S of the driving transistor T. The first stage is used as the light emitting stage, and in a subsequent light emitting process of the light emitting element L, it may be considered that the source voltage Vs of the source S of the driving transistor T1 is approximately equal to the voltage of the source S of the driving transistor T1 in the first stage. Therefore, in the embodiment, the boost input signal CK is configured, in the first stage, based on the source voltage Vs of the source S of the driving transistor T1, so that the second voltage Vg2 may be configured based on the source voltage Vs of the source S of the driving transistor T1. For example, if the source voltage Vs of the source S of the driving transistor T1 is larger and the first boost input voltage Vcl of the corresponding boost input signal Vcl in the first stage is constant (for example, is equal to zero), the second boost input voltage Vch of the boost input signal CK in the second stage may be configured to be larger, so that the second voltage Vg2 of the gate G of the driving transistor T1 is larger. Therefore, the gate-source voltage Vgs between the gate G and the source S of the driving transistor T1 is appropriate in the second stage.

Figure 7:
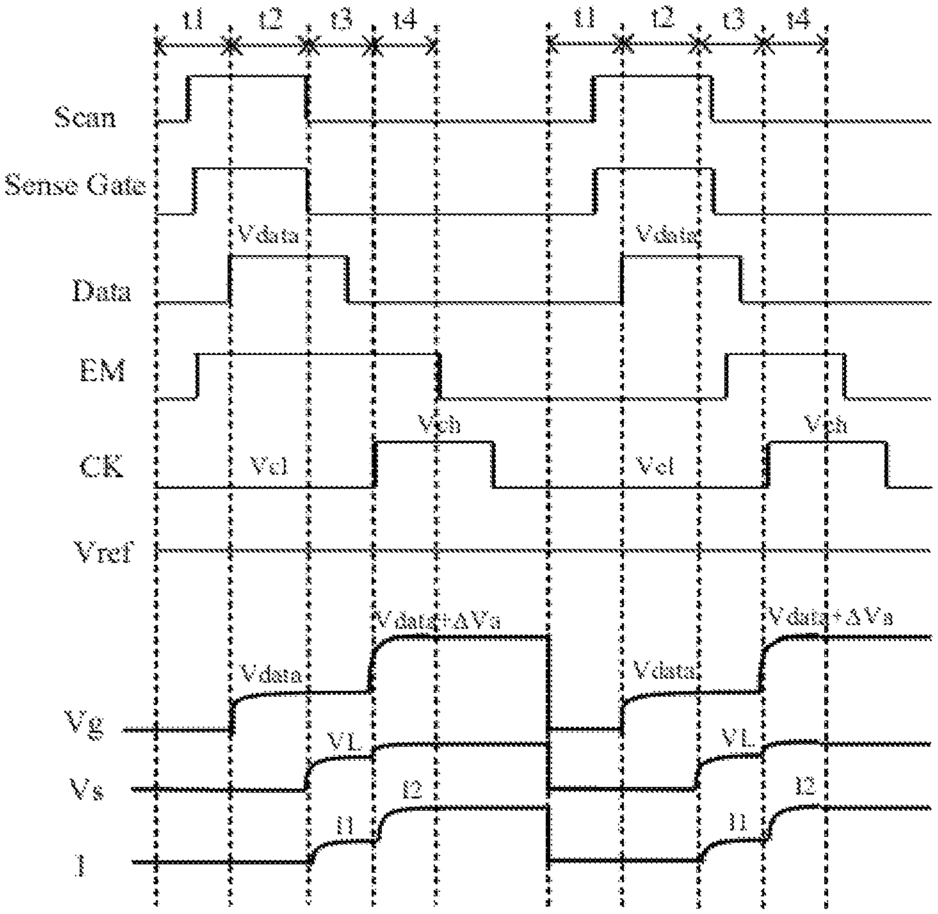
FIG. 7 is a waveform diagram of some signals according to an embodiment of the present disclosure.

Specifically, based on the circuit diagrams shown in FIG. 4 and FIG. 5 in combination with the timing diagram shown in FIG. 7, an operation process of the pixel driving circuit 100 may include, but not limited to, the following several stages: a reset stage t1, a data writing stage t2, a light emitting stage t3, and a brightening stage t4.

In the reset stage t1, the data control signal, Scan, is configured to be equal to a corresponding high potential to control the data transistor T4 to be turned on, and the data signal Data on the data line is configured to be equal to a corresponding low potential to be transmitted to the gate G of the driving transistor T1 via the data transistor T4 to reset the gate G of the driving transistor T1. At the same time, the reset control signal Sense Gate is configured to be equal to a corresponding high potential to control the reset transistor T5 to be turned on, and the reset signal Vref on the reset line is configured to be equal to a corresponding low potential to be transmitted to the source S of the driving transistor T1 via the reset transistor T5 to reset the source S of the driving transistor T1;

In the data writing stage t2, the data control signal Scan maintains a corresponding high potential to maintain the data transistor T4 to be turned on, and the data signal Scan on the data line is configured to be equal to a corresponding high potential Vdata to be transmitted to the gate G of the driving transistor T1 via the data transistor T4, so that the gate voltage Vg of the gate G of the driving transistor T1 is equal to Vdata, that is, the first boost control signal (that is, the gate voltage Vg of the gate G of the driving transistor T1) is equal to the high potential Vdata corresponding to the data signal Data to control the first boost transistor T2 to turned on. At the same time, the second boost control signal (for example, the light emitting control signal EM) is also configured to be equal to the corresponding high potential to control the second boost transistor T3 to turned on, and the boost input signal CK at the input terminal of the boost module 10 is configured to be equal to the corresponding low potential Vcl to be transmitted to the node A via the first boost transistor T2 and the second boost transistor T3. At the same time, the reset control signal Sense Gate maintains the corresponding high potential to maintain the reset transistor T5 to be turned on, and the reset signal Vref on the reset line is constantly equal to the corresponding low potential to transmitted to the source S of the driving transistor T1 via the reset transistor T5, so as to maintain the light emitting element L to be cutted off;

In a light emitting stage t3, the data control signal Scan is configured to be equal to a corresponding low potential to control the data transistor T4 to be turned off, and the reset control signal Sense Gate is configured to be equal to a corresponding low potential to control the reset transistor T5 to be turned off. Likewise, the gate voltage Vg of the gate G of the driving transistor T1 is still equal to Vdata at the initial moment of the light emitting stage t3, so that the first boost transistor T2 and the second boost transistor T3 remain still on, and thus the boost input signal Vcl is equal to the corresponding low potential Vcl to be transmitted to the node A. In combination with the effect of the first capacitor C1, the gate voltage Vg of the gate G of the driving transistor T1 is still maintained to be Vdata. In this case, because the first capacitor driving transistor T1 remains on, the second signal VDD on the second power supply line is constantly equal to the corresponding high potential, and the first signal VSS on the first power supply line is constantly equal to the corresponding low potential. Further, the reset transistor T5 is turned off, and the light emitting element L is turned on, so that the driving current I flows through the light emitting element L in the first current value I1 and the source voltage Vs of the source S of the driving transistor T1 is equal to a conduction voltage drop VL of the light emitting element L.

In a brightening stage t4, at its initial moment, the source voltage Vs of the source S of the driving transistor T1 is still equal to the conduction voltage drop VL of the light emitting element L, and the gate voltage Vg of the gate G of the driving transistor T1 is still equal to Vdata, so that the first boost transistor T2 still remains on. The second boost control signal (e.g., the light emitting control signal EM) is still maintained at the high potential, so that the second boost transistor T3 still remains on. Therefore, the boost input signal CK is equal to the high potential Vch to be transmitted to the node A, that is, the voltage at the node A is increased by ΔVa. In combination with the effect of the first capacitor C1, the gate voltage Vg of the gate G of the driving transistor T1 is also increased to (Vdata+ΔVa). In this case, the gate-source voltage Vgs between the gate G and the source S of the driving transistor T1 is increased somewhat to cause the driving current I flowing through the light emitting element L to be increased to the second current value I2, so that the source voltage Vs of the source S of the driving transistor T1 also slightly increased.

It may be understood that, in combination with the foregoing, the boost module 10 and the corresponding boost input signal CK are disposed in the present disclosure, so that the pixel driving circuit 100 has the "brightening stage" mentioned above. In the "brightening phase", the gate voltage Vg of the gate G of the driving transistor T1 is increased, so that the gate-source voltage Vgs between the gate G and the source S of the driving transistor T1 is increased. Therefore, the driving current I flowing through the light emitting element L is also increased, thereby improving the light emitting brightness of the light emitting element L, and thus improving the brightness of the display panel.

It should be noted that, after the brightening stage t4 of the frame, even if the boost input signal CK is maintained at the high potential for a time period to implement another function for another component to which the boost input signal CK is loaded, that is, to improve a multiplexing rate of the boost input signal CK, the second boost control signal (e.g., the light emitting control signal EM) being configured to be equal to a corresponding low potential may control the second boost transistor T3 to be turned off, so that the node A is floated, so as to terminate modulation of the gate voltage Vg of the gate G of the driving transistor T1. In addition, in combination with the foregoing, in the reset stage t1, the data writing stage t2, and the light emitting stage t3 in certain frame, because no voltage change of the node A is required to modulate the gate voltage Vg of the gate G of the driving transistor T1, the second boost control signal (e.g., the light emitting control signal EM) may also be the low voltage in the reset stage t1 and the data writing stage t2 to control the second boost transistor T3 to be turned off in order to save energy.

An embodiment of the present disclosure provides a display panel including a plurality of the pixel driving circuits 100 according to any of the foregoing as shown in FIGS. 1-6. Specifically, the display panel may include a display area and a non-display area surrounding the display area. The plurality of the pixel driving circuits 100 may be disposed in the display area. Further, at least a portion of the plurality of the pixel driving circuits 100 may be arranged in an array.

In an embodiment, as shown in FIG. 1 to FIG. 6, the display panel further includes: a data generation chip disposed on at least one side of a plurality of the pixel driving circuits 100, where a plurality of the data lines are electrically connected to the data generation chip to acquire the data signal, Data. Specifically, in combination with the foregoing, when the data transistor T4 is turned on, the data signal, Data, acquired by the data line may be loaded to the gate G of the driving transistor T1 via the data transistor T4 to turn on the driving transistor T1, and the light emitting element L may be controlled to emit light having the first brightness in combination with the voltage stabilization effect of the second capacitor C2 and the source voltage Vs of the driving transistor T1 later.

In an embodiment, for the pixel driving circuit 100 away from the data generation chip compared with the pixel driving circuit 100 close to the data generation chip, the voltage value of the data signal, Data, has a larger absolute value. It should be noted that the data generation chip is disposed close to at least one side of the plurality of pixel driving circuits 100, that is, the distance of each of the plurality of pixel driving circuits 100 from the data generation chip is different, resulting in a different degree of attenuation of the data signals, Data, received by the pixel driving circuits 100 at different positions. For example, the data signal, Data, loaded to each of the data lines is the same, resulting in a difference in the magnitude of the voltage of the data signals, Data, finally loaded to the pixel driving circuits 100 at different positions and affecting image display uniformity.

It may be understood in the embodiment that, for the pixel driving circuit 100 away from the data generation chip compared with the pixel driving circuit 100 close to the data generation chip, the received data signal, Data, is attenuated larger. Moreover, the voltage value of the data signal, Data, loaded by the pixel driving circuit 100 away from the data generation chip is configured to be a larger absolute value in the embodiment, so as to compensate for too large data signal, Data, due to the larger distance from the data generation chip. Therefore, the difference in attenuation of the data signals, Data, loaded by the pixel driving circuits 100 at different positions is reduced, thereby improving image display uniformity of the display panel.

In an embodiment, as shown in FIG. 1 to FIG. 6, the display panel further includes: a signal generation chip disposed on at least one side of a plurality of the pixel driving circuits 100, where, the input terminal of each of a plurality of the boost module is electrically connected to the signal generation chip to acquire the boost input signal CK. The boost input signal has a first boost input voltage in the first stage and a second boost input voltage in the second phase, and the second boost input voltage is greater than the first boost input voltage. The pixel driving circuit 100 away from the data generation chip has a larger difference between the second boost input voltage and the first boost input voltage than that of the pixel driving circuit 100 close to the data generation chip.

Specifically, the signal generation chip and the data generation chip may be installed to either a non-display area of a front surface or a back surface of the display panel by using, but not limited to, a COF (Chip On Film), a COG (Chip On Glass), a COP (Chip On Pi), or other packaging technologies. Both the signal generation chip and the data generation chip may be disposed close to at least one side of the plurality of the pixel driving circuits 100, that is, a distance of each of the plurality of the pixel driving circuits 100 at different positions from the signal generation chip may be different, and a distance of each of the plurality of the pixel driving circuits 100 at different positions from the data generation chip may be also different. It should be noted that, in combination with the foregoing, the distance of each of the pixel driving circuits 100 at different positions from the data generation chip is different, which may cause data signals, Data, received by the pixel driving circuits 100 at different locations to be attenuated to different degrees. For example, the data signal, Data, finally loaded to each of the data lines is the same, so that magnitudes of the voltages of the data signals, Data, finally loaded to the pixel driving circuits 100 at different locations are different, which affects image display uniformity. The data signals, Data, are attenuated to different degrees, which may also cause corresponding first voltages to have different magnitudes.

It may be understood in the embodiment that, for the pixel driving circuit 100 away from the data generation chip compared with the pixel driving circuit 100 close to the data generation chip, the received data signal, Data, is attenuated larger. Moreover, in the embodiment, the boost input signal CK loaded by the pixel driving circuit 100 away from the data generation chip is configured as follows: a difference between the second boost input voltage Vch and the first boost input voltage Vcl is larger, that is, a change value ΔVa (which is positively correlated with (Vch−Vcl)) of the voltage at the node A may be also larger, so as to compensate for a loss of too small first brightness caused by too small first voltage due to the larger distance from the data generation chip. By setting larger ΔVa, a difference of difference values between the second voltage and the first voltage in the pixel driving circuit 100 in different positions is reduced, so that a difference between the second brightness of the light emitting elements L at different positions may be smaller, thereby improving uniformity of a display image on the display panel.

The present disclosure provides the pixel driving circuit and the display panel. The pixel driving circuit includes: the driving transistor connected in series with the light emitting element between the first power supply line and the second power supply line, wherein the source of the driving transistor is electrically connected to the light emitting element; the data transistor, wherein the source of the data transistor is electrically connected to the data line, the drain of the data transistor is electrically connected to the gate of the driving transistor, and the gate of the data transistor is loaded with the data control signal; and the boost module, wherein the input terminal of the boost module is configured to load the boost input signal, and the output terminal of the boost module is electrically connected to the gate of the driving transistor; wherein the boost module controls the gate of the driving transistor to boost the first voltage in the first stage to the second voltage in the second stage, the second stage is later than the first stage, and the driving transistor is configured to generate the driving current based on the second voltage to drive the light emitting element to emit light. In the present disclosure, by disposing the boost module of which the input terminal is loaded with the boost input signal and the output terminal is electrically connected to the gate of the driving transistor, the gate voltage of the driving transistor can be modulated from a first voltage to a second voltage, so as to increase the driving current flowing through the light emitting element, thereby improving light emitting brightness of the light emitting element, and thus improving brightness of the display panel.

The pixel driving circuit and the display panel provided in the embodiments of the present disclosure are described in detail above. In this specification, principles and implementations of the present disclosure are illustrated by applying specific examples herein. The description of the above embodiments is only used to help understand the technical solutions and core ideas of the present disclosure; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present disclosure.

What is claimed is:

1. A pixel driving circuit, comprising:

a driving transistor connected in series with a light emitting element between a first power supply line and a second power supply line, wherein a source of the driving transistor is electrically connected to the light emitting element;

a data transistor, wherein a source of the data transistor is electrically connected to a data line, a drain of the data transistor is electrically connected to a gate of the driving transistor, and a gate of the data transistor is loaded with a data control signal; and a boost module, wherein an input terminal of the boost module is configured to be loaded with a boost input signal, and an output terminal of the boost module is electrically connected to the gate of the driving transistor;

wherein the boost module is configured to control the voltage of the gate of the driving transistor to boost from a first voltage in a first stage to a second voltage in a second stage, the second stage is later than the first stage, and the driving transistor is configured to generate a driving current based at least on the second voltage to drive the light emitting element to emit light;

wherein the boost module comprises:

a first capacitor, wherein a first electrode plate of the first capacitor is electrically connected to the gate of the driving transistor to server as the output terminal of the boost module; and a first boost transistor, wherein a drain of the first boost transistor is electrically connected to a second electrode plate of the first capacitor, a source of the first boost transistor is electrically connected to the input terminal of the boost module, a gate of the first boost transistor is loaded with a first boost control signal, and the first boost transistor is turned on in both the first stage and the second stage; and wherein the boost input signal has a first boost input voltage in the first stage and a second boost input voltage in the second stage, and the second boost input voltage is greater than the first boost input voltage.

2. The pixel driving circuit of claim 1, wherein the boost module further comprises:

a second boost transistor, wherein a drain of the second boost transistor is electrically connected to the source of the first boost transistor, a source of the second boost transistor is electrically connected to the input terminal of the boost module, a gate of the second boost transistor is loaded with a second boost control signal, and the second boost transistor is turned on in both the first stage and the second stage; and wherein the gate of the first boost transistor is electrically connected to the gate of the driving transistor.

3. The pixel driving circuit of claim 1, wherein the gate of the first boost transistor is electrically connected to a boost control line to be loaded with a first boost control signal, wherein the first boost control signal is a light emitting control signal.

4. The pixel driving circuit of claim 1, further comprising:

a second capacitor, wherein a first electrode plate of the second capacitor is electrically connected to the second electrode plate of the first capacitor and a second electrode plate of the second capacitor is electrically connected to the source or the drain of the driving transistor.

5. The pixel driving circuit of claim 1, wherein the boost module further comprises:

a third capacitor; and a boost switch connected in series with the third capacitor between the gate of the driving transistor and the source of the driving transistor;

wherein in the first stage and a third stage earlier than the first stage, the boost switch is turned on to control the voltage of the gate of the driving transistor to boost from a third voltage in the third stage to the first voltage in the first stage.

6. The pixel driving circuit of claim 1, further comprising:

a reset transistor, wherein a source of the reset transistor is electrically connected to a reset line, a drain of the reset transistor is electrically connected to the source of the driving transistor, and a gate of the reset transistor is loaded with a reset control signal.

7. A display panel, comprising a plurality of pixel driving circuits, each of the pixel driving circuits comprises:

a driving transistor connected in series with a light emitting element between a first power supply line and a second power supply line, wherein a source of the driving transistor is electrically connected to the light emitting element;

a data transistor, wherein a source of the data transistor is electrically connected to a data line, a drain of the data transistor is electrically connected to a gate of the driving transistor, and a gate of the data transistor is loaded with a data control signal; and a boost module, wherein an input terminal of the boost module is configured to be loaded with a boost input signal, and an output terminal of the boost module is electrically connected to the gate of the driving transistor;

wherein the boost module is configured to control the voltage of the gate of the driving transistor to boost from a first voltage in a first stage to a second voltage in a second stage, the second stage is later than the first stage, and the driving transistor is configured to generate a driving current based at least on the second voltage to drive the light emitting element to emit light;

wherein the boost module comprises:

a first capacitor, wherein a first electrode plate of the first capacitor is electrically connected to the gate of the driving transistor to server as the output terminal of the boost module; and a first boost transistor, wherein a drain of the first boost transistor is electrically connected to a second electrode plate of the first capacitor, a source of the first boost transistor is electrically connected to the input terminal of the boost module, a gate of the first boost transistor is loaded with a first boost control signal, and the first boost transistor is turned on in both the first stage and the second stage; and wherein the boost input signal has a first boost input voltage in the first stage and a second boost input voltage in the second stage, and the second boost input voltage is greater than the first boost input voltage.

8. The display panel of claim 7, further comprising:

a data generation chip disposed on at least one side of the plurality of the pixel driving circuits, wherein the plurality of the data lines are electrically connected to the data generation chip to acquire a data signal.

9. The display panel of claim 8, wherein for the pixel driving circuit away from the data generation chip compared with the pixel driving circuit close to the data generation chip, a voltage value of the data signal has a larger absolute value.

10. The display panel of claim 8, further comprising:

a signal generation chip disposed on at least one side of the plurality of the pixel driving circuits, wherein an input terminal of each of a plurality of the boost modules is electrically connected to the signal generation chip to acquire the boost input signal;

wherein the boost input signal has a first boost input voltage in the first stage and a second boost input voltage in the second stage, and the second boost input voltage is greater than the first boost input voltage; and wherein for the pixel driving circuit away from the data generation chip compared with the pixel driving circuit close to the data generation chip, a difference between the second boost input signal and the first boost input signal is larger.

11. A display panel, comprising a pixel driving circuit comprising:

a first transistor connected in series with a light emitting element between a first power supply line and a second power supply line, wherein a source of the first transistor is electrically connected to the light emitting element;

a second transistor, wherein a source of the second transistor is electrically connected to a first signal line, a drain of the second transistor is electrically connected to a gate of the first transistor, and a gate of the second transistor is electrically connected to a second signal line; and a first module, wherein an input terminal of the first module is electrically connected to a third signal line, an output terminal of the first module is electrically connected to the gate of the first transistor, and a control terminal of the first module is electrically connected to a fourth signal line;

wherein the first module comprises:

a first capacitor, wherein a first electrode plate of the first capacitor is electrically connected to the gate of the driving transistor to serve as the output terminal of the first module;

a third transistor, wherein a drain of the third transistor is electrically connected to a second electrode plate of the first capacitor, a source of the third transistor is electrically connected to the input terminal of the first module, and a gate of the third transistor is electrically connected to the fourth signal line; and a fourth transistor, wherein a drain of the fourth transistor is electrically connected to the drain of the third transistor, a source of the fourth transistor is electrically connected to the input terminal of the first module, and a gate of the fourth transistor is electrically connected to a fifth signal line different from the gate of the first transistor; and wherein the gate of the third transistor is electrically connected to the gate of the first transistor.

12. The display panel of claim 11, wherein the pixel driving circuit further comprises:

a second capacitor, wherein a first electrode plate of the second capacitor is electrically connected to the second electrode plate of the first capacitor and a second electrode plate of the second capacitor is electrically connected to the source or the drain of the first transistor.

13. The display panel of claim 11, wherein the first module further comprises:

a third capacitor; and a first switch connected in series with the third capacitor between the gate of the first transistor and the source of the first transistor, wherein the first switch is configured to control the third capacitor to be electrically connected between the gate of the first transistor and the source of the first transistor.

14. The display panel of claim 11, further comprising:

a fifth transistor, wherein a source of the fifth transistor is electrically connected to a sixth signal line, a drain of the fifth transistor is electrically connected to the source of the first transistor, and a gate of the fifth transistor is electrically connected to a seventh signal line.

15. The display panel of claim 11, comprising a plurality of the pixel driving circuits and further comprising:

a data generation chip disposed on at least one side of the plurality of the pixel driving circuits, wherein the plurality of the data lines are electrically connected to the data generation chip to acquire a data signal.

16. The display panel of claim 15, wherein for the pixel driving circuit away from the data generation chip compared with the pixel driving circuit close to the data generation chip, a voltage value of the data signal has a larger absolute value.

17. The display panel of claim 15, further comprising:

a signal generation chip disposed on at least one side of the plurality of the pixel driving circuits, wherein an input terminal of each of a plurality of the boost modules is electrically connected to the signal generation chip to acquire the boost input signal;

wherein the boost input signal has a first boost input voltage in the first stage and a second boost input voltage in the second stage, and the second boost input voltage is greater than the first boost input voltage; and wherein for the pixel driving circuit away from the data generation chip compared with the pixel driving circuit close to the data generation chip, a difference between the second boost input signal and the first boost input signal is larger.

* * * * *